(12) United States Patent
Khayrallah

(10) Patent No.: US 9,357,432 B2
(45) Date of Patent: May 31, 2016

(54) MEDIA STREAMING WITH HIGH RATE AVAILABILITY

(71) Applicant: TELEFONAKTIEBOLAGET L M ERICSSON (PUBL), Stockholm (SE)

(72) Inventor: Ali S. Khayrallah, Mountain View, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 66 days.

(21) Appl. No.: 14/293,136

(22) Filed: Jun. 2, 2014

(65) Prior Publication Data

US 2015/0350947 A1    Dec. 3, 2015

(51) Int. Cl.
| H04K 1/00 | (2006.01) |
| H04K 1/10 | (2006.01) |
| H04W 28/02 | (2009.01) |
| H04L 29/06 | (2006.01) |
| H04W 12/04 | (2009.01) |
| H04L 9/06 | (2006.01) |
| H04W 36/00 | (2009.01) |

(52) U.S. Cl.
CPC ............ *H04W 28/0268* (2013.01); *H04L 9/06* (2013.01); *H04L 65/1083* (2013.01); *H04L 65/60* (2013.01); *H04L 65/80* (2013.01); *H04W 12/04* (2013.01); *H04W 36/00* (2013.01)

(58) Field of Classification Search
CPC ....... H04W 4/00; H04W 4/003; H04W 12/00; H04W 12/08; H04W 36/005; H04W 36/0061; H04W 36/0066; H04W 16/24; H04N 21/4181; H04N 21/41407

USPC .................... 380/200, 270, 31; 713/189, 193; 725/25, 31, 62, 63; 726/26–27, 30
See application file for complete search history.

(56) References Cited

U.S. PATENT DOCUMENTS

| 6,909,708 | B1 * | 6/2005 | Krishnaswamy ..... H04L 65/103 370/352 |
| 6,961,430 | B1 * | 11/2005 | Gaske ...................... H04N 5/76 348/E7.056 |
| 7,069,573 | B1 * | 6/2006 | Brooks .............. H04N 7/17336 348/E7.073 |

(Continued)

FOREIGN PATENT DOCUMENTS

EP    1 959 703 A1    8/2008

OTHER PUBLICATIONS

Kreitz G et al. Spotify—Large Scale Low Latency. P2P Music-on-Demand Streaming. Peer-to-Peer Computing (P2P). 2010 Tenth International Conference on. Piscataway, NJ, USA, IEEE Aug. 25, 2010.

*Primary Examiner* — Hosuk Song

(57) ABSTRACT

A system and method for media streaming in a scenario where very high bitrate wireless service is available within a macro cell through small cells. When a mobile device is in a small cell, a base station may download the multimedia content onto the mobile device at the high bitrate instead of streaming the content at a low bitrate. The mobile device cannot misuse the content made available through the download because its ability to de-scramble the downloaded information is made time dependent by a two-stage scrambling process at the base station that keeps the information scrambled until it is ready to be consumed. The base station withholds from the mobile device information related to de-scrambling of the received content until the appropriate time. Such withheld information includes time-varying decryption keys, which control the timing of decryption and are supplied to the mobile device in a temporally sequential manner.

22 Claims, 6 Drawing Sheets

(56) References Cited

U.S. PATENT DOCUMENTS

| | | | |
|---|---|---|---|
| 8,316,091 B2 * | 11/2012 | Hirvela | H04W 4/00 709/206 |
| 8,929,342 B1 * | 1/2015 | Oroskar | H04W 36/0044 370/332 |
| 2010/0091737 A1 | 4/2010 | Xu et al. | |
| 2013/0152115 A1 | 6/2013 | Albal et al. | |
| 2015/0095450 A1 * | 4/2015 | Vitthaladevuni | H04L 65/602 709/217 |
| 2015/0180924 A1 * | 6/2015 | O'Callaghan | H04L 65/60 709/219 |

* cited by examiner

MEDIA STREAMING WITH HIGH RATE AVAILABILITY

TECHNICAL FIELD

The present disclosure relates to delivery of multimedia content in a mobile communication network. More particularly, and not by way of limitation, particular embodiments of the present disclosure are directed to a system and method that uses double scrambling of messages to facilitate media streaming at high data rates within a small cell in a macro cell without violating streaming-related legal restrictions.

BACKGROUND

Media streaming is growing in popularity and it constitutes a dominant portion of the total volume of wireless data consumed by mobile devices operating in a wireless communication network such as, for example, a cellular network. In media streaming, multimedia content such as audio-visual content, video segments, audio files, etc., is scrambled by the content provider prior to delivery and un-scrambled at the receiver to enforce legal restrictions associated with content streaming.

It is noted here that the terms "multimedia content," "media", "content," or other terms of similar import are used interchangeably herein to primarily refer to data content having one or more of the following: audio components, video components (including animation, mobile gaming content, etc.), and image content, with or without accompanying textual information.

In the context of a wireless network, for example, a "provider" or "sender" of the multimedia content may include a Base Station (BS) or a Radio Base Station (RBS), a Base Station Controller (BSC), a Radio Network Controller (RNC), an evolved Node B (eNodeB or eNB), etc. On the other hand, a "receiver" of such content may include a mobile or wireless device operating in the wireless network such as, for example, a User Equipment (UE), a mobile handset, a cell phone, a tablet or laptop computer, etc.

The discussion below first addresses how information is handled in "streaming", and then briefly discusses "downloading" as an alternative form of content delivery to better show the contrast between these two approaches.

Scrambling and Sandbox

In the discussion herein, the term "scrambled" is used to mean that data is modified in some way to make it unreadable, unless some additional information, in the form of a digital "key", is available to "un-scramble" (also interchangeably referred to as "de-scramble" or "decrypt") it. For example, the well-known public-key cryptography scheme uses a private/public key cryptography system where, at the transmitter, a scrambler uses a public key specific to the intended receiver. At the receiver, a de-scrambler uses a corresponding private key to retrieve the clear (i.e., unscrambled) data. Instead of this public-key cryptography scheme, a private-key cryptography scheme may be used, where the same private key is available at the transmitter as well as at the receiver.

An application is said to operate in a "sandbox" when other processes are not allowed to read the memory locations dedicated for that application. Also, the application operating in the sandbox may be forbidden from sharing its information in its dedicated memory with other applications in the same device, or transmitting that information with other devices. For example, a de-scrambler application may de-scramble information inside its "sandbox." The de-scrambled or "clear" information/data may not be shared, for example, by writing it to memory locations outside the sandbox or by some other means. Such restrictions may be enforced by the operating system. This is essentially no different than how multiple virtual machines run on the same computer hardware, with separation between two virtual machines enforced by rules in the operating system.

Streaming

A streaming player in a receiver of streamed content reconstructs the current content from a small amount of recent information. Thus, the streaming player does not need to keep the older information. Although the streaming player does not have to erase the older information to function properly, it erases it because it is required to do so by the owner of the multimedia content or by the laws governing delivery and reproduction of streamed content.

Without much loss of generality, it is assumed here that streamed information is received at a client/receiver such as, for example, a mobile or wireless device, in a scrambled form. The streaming media player in the client may un-scramble the received information inside its sandbox, and process it to reconstruct the original content. As noted earlier, only the most current information is needed for this reconstruction. Hence, it is assumed that such current information is in the "clear" (i.e., de-scrambled) form only inside the sandbox. One way to erase the clear information as it gets old is to simply over-write it with new information. The clear information may be never seen outside the sandbox.

In normal live streaming, the client-based streaming media player renders the media for consumption at the client by processing information messages as they arrive. This requires a steady flow of messages in order to keep feeding the player with enough information. In a wireless network, the streaming bit rate may change within a relatively narrow range to adapt to varying channel conditions, and the reconstruction quality of the media may adapt accordingly. As noted below, due primarily to contractual/legal requirements, a streaming media player erases the received information as it is consumed; it only keeps the most recent information in memory.

The "streaming" differs from a "download" (discussed below) in that the streaming does not allow the entire content to be stored for repeated playback. If not explicit, there is an implied or implicit "contract" between a streaming server and its client restricting how the streamed content may be consumed. Some aspects of this streaming contract between the server/transmitter and the client/receiver are enforced by the structure of the streaming scheme itself. That is, the client does not receive messages beyond what it needs now. However, other aspects of the contract are enforced by the client itself. That is, de-scrambled information is in the clear only inside the client's sandbox and is erased as it gets consumed. It would be a violation of the streaming contract—and there would presumably be legal recourse if the violation is detected—if the client does not erase the information as required, or if the client shares clear information outside its sandbox. However, in the discussion herein, it is assumed that the content owner and its client are complying with their streaming contract and, hence, contract violation-related possibility will not be considered any further.

Media Download

In contrast to the streaming mode described earlier, media also may be transmitted as a "download." In a download, the information needed to describe the complete content may be transferred as a data file. The whole file is then stored in a memory at the client. The client-based media player retrieves the information from the memory as needed and reconstructs the content.

The legal landscape governing media downloads is different from the above-described streaming contract-based legal landscape governing media streaming. In a media download, once the whole description of the content is in the client's memory, then, in principle, it can be played repeatedly, modified, distributed to other clients/systems, and so on. Thus, in a media download, there is significant loss of control on the part of the content owner. Consequently, the fees are typically much higher for downloading some content than for streaming it. On the other hand, some content is only available for streaming, and never for download. Streaming may be considered to be equivalent to a performance of the content, whereas a download may be considered to be ownership of it.

Modern wireless networks are moving in the direction of densification because cellular system deployment has reached practical limits in many urban areas, while data traffic only continues to increase. Hence, to increase area spectral efficiency to accommodate the increasing data traffic, network operators are moving in the direction of Heterogeneous Networks (HetNet). Heterogeneous networks are an attractive means of expanding mobile network capacity. A HetNet may support multiple radio access technologies, architectures, transmission solutions, and base stations of varying transmission power. Heterogeneous networks may consist of planned macro base station deployments that typically transmit at high power overlaid with several low power nodes such as pico base stations, distributed antennas, femto base stations, and relays. The low power nodes may be deployed to eliminate coverage holes such as, for example, "dead spots" or coverage holes in outdoor and indoor environments such as, for example, a geographical area having a large number of office buildings requiring heavy indoor data traffic, and also to increase the capacity/area of the network. Remote radio heads or distributed antennas may be connected to the macro base station using a high bandwidth, low-latency dedicated connection. These radio heads may have minimal autonomous intelligence and may act as extensions of the base station antenna ports. Fixed relays are infrastructure equipment that connect wirelessly to the network backbone. These relays aid in the signal transmission between the macro base station and the mobile users by receiving and re-transmitting the signals. Picocells and femtocells are small base stations that may be operating under the control of the macro base station and installed in dead spots or high traffic areas to increase the network coverage and capacity.

The low power nodes may provide radio coverage over "small cells," which are cells within the larger macro cell. A small cell is a cell whose coverage area may be defined by the ability of terminals to communicate with it, such as, for example, the ability to listen to its control channel on the downlink, the ability to successfully attach to it, etc. The macro cell remains under the overall radio coverage of the macro base station. Thus, one or more small cells with large bandwidth may be available/overlaid within the coverage area of a macro cell with smaller bandwidth. The small cell coverage is assumed to be spotty, with users moving in and out of small cells while remaining connected the macro cell. Small cells offer the promise of very high data rate availability, due to the large bandwidth, proximity to the user, and the small number of users attached to a given small cell.

SUMMARY

The promise of high data rate availability in a small cell, however, cannot be exploited in the context of media streaming. Once the data rate reaches the peak value that the streaming media player can take, there is no use for additional information. Hence, the opportunity for high data rate streaming is lost.

FIGS. 1A and 1B show an exemplary macro cell 10 of a cellular network to illustrate how streaming of multimedia content is currently handled when the macro cell has one or more small cells 12, 14. For ease of illustration, any relay, antenna, or pico/femto base stations associated with the small cells 12, 14 are not shown in FIGS. 1A-1B. However, an exemplary macro base station 16 that provides radio coverage over the entire macro cell 10 is shown in FIGS. 1A-1B along with an exemplary mobile/wireless device 18 that is receiving the streamed content from the base station 16. It is noted here that, for ease of illustration, the macro cell 10 and the small cells 12, 14 are each shown having an elliptical shape in FIGS. 1-2 to depict generic areas for such cells. However, in a cellular network, the cells 10, 12, 14 may be of any other shape.

For a simple illustration of how currently-available streaming approaches fail to exploit the high data rate availability over a small cell (such as the small cell 12 or 14), a modern video streaming scheme that requires an information streaming rate of about 5-10 Mbps (Mega bits per second or Mbits/s) is considered as an example. It is understood that such rates can be supported by macro cells in today's cellular networks such as, for example, the Long Term Evolution (LTE) networks. On the other hand, each of the small cells 12, 14 may offer data rates of up to 10 Gbps (Giga bits per second or Gbits/s). However, as discussed below, current streaming approaches fail to take advantage of such high data rates—even if available only over a portion of the cellular network.

In FIG. 1A, the mobile device 18 is shown to be present in the macro cell 10, but not yet moved/entered into a small cell. The arrow 19 in FIG. 1A indicates that the mobile device 18 is receiving a streamed content from the base station 16. The content may be streamed at a data rate of x Mbps (where "x" may be equal to 5 or 10 when the streaming rate is 5-10 Mbps). Over a period of time, the wireless device 18 may enter or can connect to a small cell. FIG. 1B illustrates a situation where the wireless device 18 has moved into the radio coverage of one of the small cells—here, the small cell 14. As noted earlier, the small cell 14 may offer or support data rates of up to 10 Gbits/s. Even if the small cell 14 is really small in area and even if the client device 18 is present in it or availing of its high data rate coverage for only a few seconds, it would still be enough time to download an hour worth of content because downloading at 10 Gbps is 1000 times faster than streaming at even the highest rate of 10 Mbps. The 1000 times higher download rate in the small cell 14 accelerates the content delivery by a factor of 1000. However, as mentioned earlier, this promise of high data rate availability over a small cell cannot be exploited in the context of currently-available media streaming approaches because once the data rate reaches the peak value that the mobile device's streaming media player can take such as, for example, 10 Mbps, there is no use for additional information. This situation is indicated by the same arrow 19 in FIGS. 1A and 1B. The mobile device 18 continues to receive the content streamed at x Mbps even if it is present in the small cell 14 that can now support content delivery at a significantly higher data rate.

In principle, a download may be transmitted at any data rate available, so it may exploit the promise of a small cell's high data rate availability. However, if left unchecked, a media download may end up violating the streaming-related legal restrictions of the content owner because, as discussed earlier, a downloaded content, in principle, can be played repeatedly, modified, distributed to other clients, and so on.

Thus, it would be desirable if streaming, as opposed to a download, could be evolved to take advantage of the high data rates supported by small cells within a macro cell. It would be further desirable to restrict the mobile device to consume the multimedia content received at the higher rate in the same manner as the multimedia content traditionally streamed to the mobile device at the lower bitrate, thereby alleviating media download-related legal concerns and loss of control on the part of the content owner.

As a solution, particular embodiments of the present disclosure provide a system and method that unlocks the promise of small cell high data rates for media streaming. In one embodiment, a two-stage scrambling mechanism is employed to facilitate media streaming at high data rates within a small cell in a macro cell without violating streaming-related legal restrictions. This enables the transmission of streaming information at high rates, while maintaining the restrictions imposed by the content owner on the further use and consumption of the received streamed content. An additional data scrambling mechanism keeps the information scrambled until it is ready to be consumed by the streaming player in the client device. This additional layer of scrambling makes the ability of the client to de-scramble the received information time dependent. To do so, the transmitter such as, for example, a macro base station or a pico base station, may withhold from the receiver such as, for example, a mobile device or a streaming media player in the mobile device, some information related to de-scrambling of the received content until the appropriate time. Therefore, even if the client device receives the multimedia content at a high data rate in a small cell, the received content may not be played back or consumed by the client device until "allowed" by the transmitter.

In one embodiment, the present disclosure is directed to a method of delivering multimedia content to a mobile device operating in a macro cell in a cellular network. The cellular network supports a first bitrate and a second bitrate for transmitting the multimedia content to the mobile device. The method comprises performing the following using a network entity in the cellular network: (i) streaming the multimedia content to the mobile device at the first bitrate, wherein the first bitrate is available throughout the macro cell and wherein the second bitrate is available only over a small cell within the macro cell and is substantially higher than the first bitrate; and (ii) upon detecting that the mobile device is present in the small cell, delivering the multimedia content to the mobile device at the second bitrate instead of streaming at the first bitrate.

In a further embodiment, the present disclosure is directed to a network entity in a cellular network for delivering multimedia content to a mobile device operating in a macro cell in the cellular network. The cellular network supports a first bitrate and a second bitrate for transmitting the multimedia content to the mobile device. The network entity comprises: a transceiver for wirelessly communicating with the mobile device; a memory for storing program instructions; and a processor coupled to the memory and the transceiver and configured to execute the program instructions. The program instructions, when executed by the processor, cause the processor to perform the following: (i) stream the multimedia content via the transceiver to the mobile device at the first bitrate, wherein the first bitrate is available throughout the macro cell and is substantially lower than the second bitrate; and (ii) upon detecting that the second bitrate is available in the macro cell for transmitting the multimedia content to the mobile device, download the multimedia content onto the mobile device via the transceiver at the second bitrate instead of streaming the multimedia content at the first bitrate.

In a still further embodiment, the present disclosure is directed to a mobile device that is operating in a macro cell in a cellular network. The mobile device comprises: a transceiver for wirelessly communicating with a network entity in the cellular network, wherein the network entity provides radio coverage over the macro cell; a memory for storing program instructions; and a processor coupled to the memory and the transceiver and configured to execute the program instructions. The program instructions, when executed by the processor, cause the processor to perform the following: (i) receive via the transceiver multimedia content streamed to the mobile device at a first bitrate by the network entity, wherein the cellular network supports the first bitrate and a second bitrate for transmitting the multimedia content to the mobile device, and wherein the first bitrate is available throughout the macro cell and wherein the second bitrate is available only over a small cell within the macro cell and is substantially higher than the first bitrate; (ii) when the mobile device is present in the small cell, receive the multimedia content via the transceiver as a download sent from the network entity at the second bitrate, instead of receiving the multimedia content as a streamed content at the first bitrate, wherein the download includes: (a) a plurality of messages twice-scrambled by the network entity, wherein each message in the plurality of messages is initially scrambled by the network entity using a cryptography scheme that is the same as that used by the network entity for scrambling the multimedia content streamed at the first bitrate, and wherein each initially-scrambled message in the plurality of messages is further scrambled by the network entity using a time-varying cryptography scheme that is different from the cryptography scheme used by the network entity for scrambling the multimedia content streamed at the first bitrate, and (b) a current decryption key sent to the mobile device by the network entity as part of the time-varying cryptography scheme, wherein the current decryption key is part of a plurality of time-varying decryption keys to be sent to the mobile device by the network entity in a temporally-sequential manner, wherein each decryption key in the plurality of time-varying decryption keys is configured to de-scramble only a key-specific portion of the plurality of messages and is supplied to the mobile device only when a time instance associated with that decryption key occurs; and (iii) using the current decryption key, de-scramble only that message in the plurality of messages which is associated with the current decryption key.

Thus, the present disclosure addresses media streaming in a scenario where very high data rate wireless service is occasionally available within a macro cell through small cells. The content streaming solution according to certain embodiments of the present disclosure enables full utilization of small cells for media streaming, and frees up macro cells for other tasks. Network densification with small cells is a growing trend in wireless networks. Also, media streaming constitutes a dominant portion of the total volume of wireless data, and it is increasing fast. Therefore, the higher rate media streaming solution according to particular embodiments of the present disclosure provides a perfect match of capabilities of small cells and needs of network operators and their clients.

BRIEF DESCRIPTION OF THE DRAWINGS

In the following section, the present disclosure will be described with reference to exemplary embodiments illustrated in the figures, in which.

DETAILED DESCRIPTION

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the present disclosure. It should be understood that the disclosure is described primarily in the context of a Third Generation Partnership Project (3GPP) cellular telephone/data network (e.g., an LTE network), but it can be implemented in other forms of cellular or non-cellular wireless networks as well.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments.

In the discussion below, "streaming" and "downloading" are discussed as two distinct examples of network-based delivery of multimedia contents. As noted earlier, a different legal landscape governs each of these content delivery approaches. For example, a "streamed content" may not be stored in its entirety and repeatedly played back, whereas a "downloaded content" may not have such restrictions. Hence, in the discussion below, the distinctions associated with "streaming" and "downloading" are maintained to illustrate how double-scrambling may be used as per teachings of particular embodiments of the present disclosure in conjunction with high data rate downloading in a small cell to expedite delivery of "streamed content" to a mobile device without violating streaming-related restrictions even if the content is delivered through downloading.

Figure 1A:
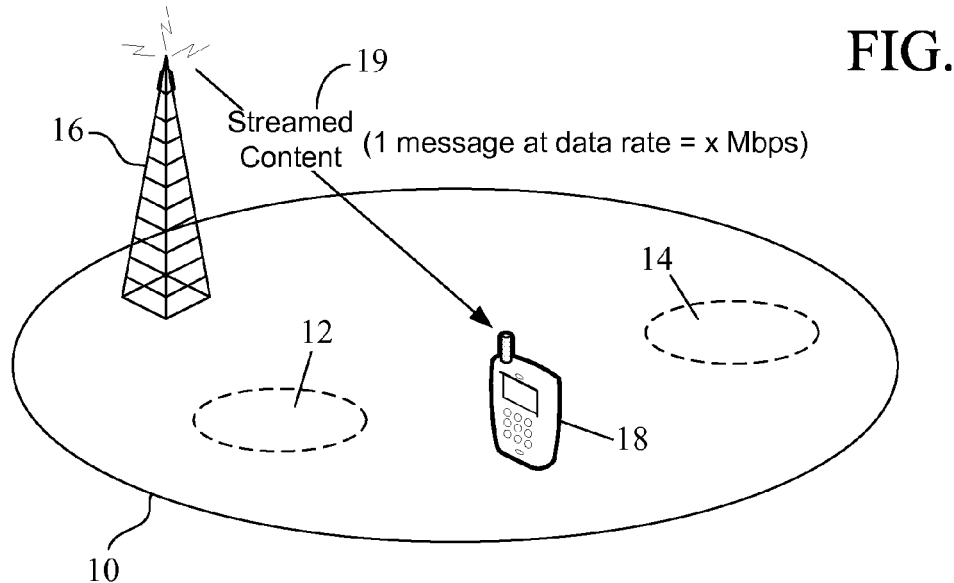
FIGS. 1A-1B show an exemplary macro cell of a cellular network to illustrate how streaming of multimedia content is currently handled when the macro cell has one or more small cells.
Figure 1B:
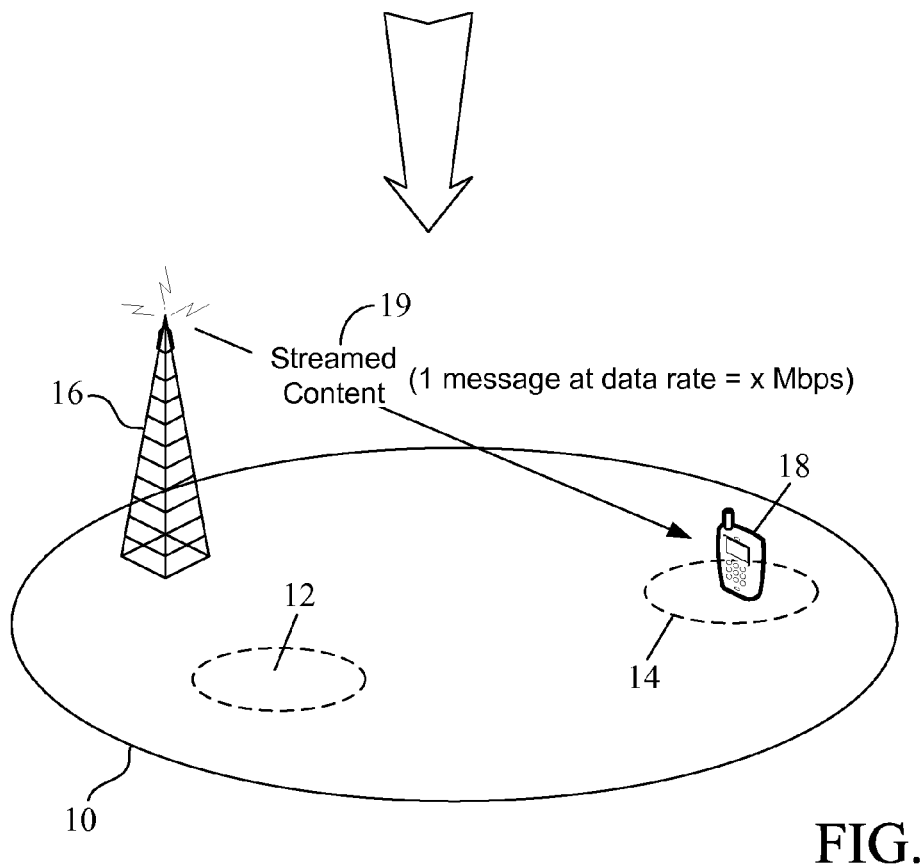
Figure 2:
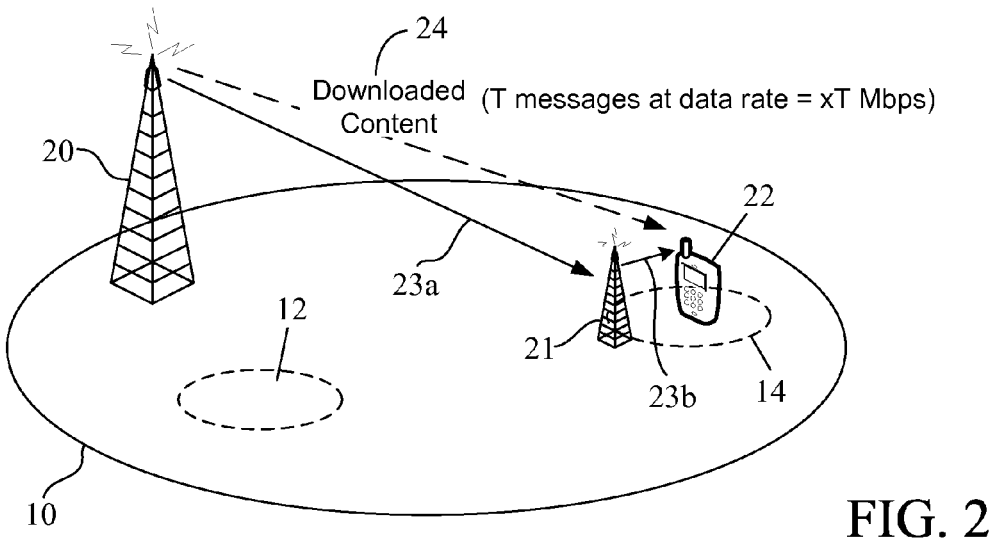
FIG. 2 is an exemplary illustration distinguishing the streaming approach in FIG. 1B with the high data rate delivery of streamed content over a small cell according to particular embodiments of the present disclosure.

FIG. 2 is an exemplary illustration distinguishing the streaming approach in FIG. 1B with the high data rate delivery of streamed content over a small cell, such as the small cell 14, according to particular embodiments of the present disclosure. In contrast to the base station 16 and the mobile device 18 in FIG. 1B, in the embodiment of FIG. 2, a network entity 20, which may be a macro base station as discussed later below with reference to FIG. 3, and a mobile device 22, which may be a UE or other wireless device as also discussed below, may be configured to accomplish high data rate downloading of "streamed content" as per the teachings of particular embodiments of the present disclosure. In the embodiment of FIG. 2, an exemplary secondary entity, such as a pico base station 21, is shown to provide radio coverage over the small cell 14. Thus, when the mobile device 22 is physically present in the operative range of the small cell 14 or is able to communicate with the pico base station 21 associated with the small cell 14, the network entity 20 may deliver the multimedia content to the pico base station 21 (arrow 23a in FIG. 2) and, through the pico base station 21, to the mobile device 22 (arrow 23b in FIG. 2). The content may be delivered at the higher data rate supported by the small cell 14. Such content delivery may be through downloading as noted at the dotted arrow 24, which represents how the multimedia content is in effect delivered from the network entity 20 to the mobile device 22 at the higher data rate. As mentioned earlier, even though the multimedia content is delivered through "downloading," the content is to be played back as a "streamed content." Hence, particular embodiments of the present disclosure provide for an exemplary mechanism to maintain streaming-related restrictions on the delivered content even when the content is delivered through "downloading" instead of "streaming."

In FIG. 2, if the download bitrate supported by the small cell 14 is "T" times the highest streaming rate of x Mbps (in FIGS. 1A-1B), the network entity 20 may download the multimedia content at the data rate of xT Mbps. For example, the maximum streaming bitrate may be 10 Mbps (i.e., x=10), but the small cell 14 may support the download data rate of 10 Gbps (i.e., T=1000). Thus, in the time it takes to stream one message at the data rate of x Mbps (in FIG. 1B), the network entity 20 in the embodiment of FIG. 2 may deliver, for example, through a download via the pico base station 21, T messages of the multimedia content to the mobile device 22 as indicated at arrow 24 in FIG. 2. As a result, significant improvement in the speed of content delivery may be accomplished in the embodiment of FIG. 2 as opposed to the conventional streaming approach presented in FIG. 1B, without violating streaming-related legal restrictions as discussed later below.

Figure 3:
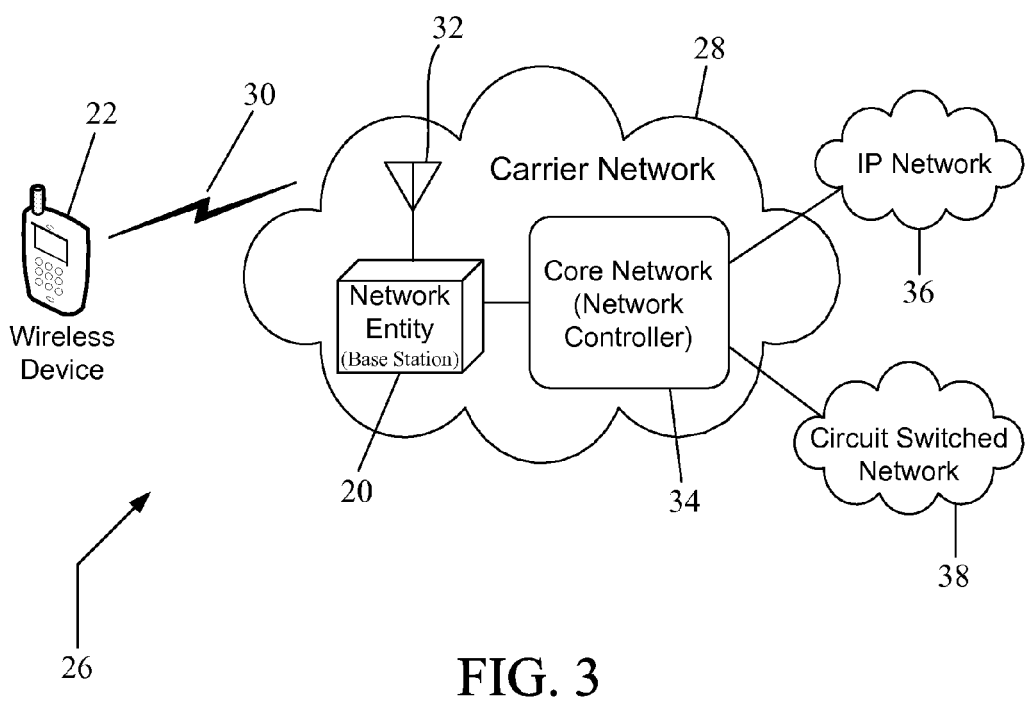
FIG. 3 depicts an exemplary wireless system in which the high data rate content streaming solution according to one embodiment of the present disclosure may be implemented.

FIG. 3 depicts an exemplary wireless system 26 in which the high data rate content streaming solution according to one embodiment of the present disclosure may be implemented. The exemplary wireless or mobile device 22 is shown as being operational in the system 26 through a mobile communication network 28. In the discussion herein, the terms "wireless network," "mobile communication network," or "carrier network" may be used interchangeably to refer to a wireless communication network (e.g., a cellular network, a proprietary data communication network, a corporate-wide wireless network, etc.) facilitating voice and/or data communication with different types of wireless devices (like the device 22). In one embodiment, the wireless device 22 may be a User Equipment (UE) or a Mobile Station (MS) (also known by various analogous terms such as "mobile handset," "wireless handset," "mobile device," "mobile terminal," etc.) capable of receiving delivered multimedia content such as, for example, through streaming, downloading, etc., from the network 28 and playing it using a local streaming media player (not shown). Some examples of UEs or mobile handsets/devices include cellular telephones or data transfer equipments (e.g., a Personal Digital Assistant (PDA) or a pager), smartphones (e.g., iPhone™, Android™ phones, Blackberry™, etc.), handheld or laptop computers, Bluetooth® devices, electronic readers, portable electronic tablets, etc.

The wireless device 22 in the system 26 is shown to be in wireless communication, for example, via a radio link 30, with the wireless network 28 through a network entity (also interchangeably referred to herein as a "mobile communication node" or simply a "node") 20 of the network 28. As noted earlier, in one embodiment, the network entity 20 may be a base station (BS) providing radio coverage over a macro cell in the network 28, such as, for example, the cell 10 in FIG. 2, that has one or more small cells 12, 14 within it. Because of network densification, the network entity 20 may provide radio coverage over the small cells 12, 14 either directly or through an appropriate secondary entity under its control such as, for example, a pico or femto base station, distributed antennas, relays, etc. Except for the secondary entity 21 in FIG. 2, additional secondary entities are not shown in FIGS. 2-3 and elsewhere for the sake of simplicity.

The base station 20 may provide radio interface (in the form of Radio Frequency (RF) link 30) to the device 22 via an antenna unit 32, and with or without the help of a secondary entity such as a pico or femto base station. Thus, terminals operating in a wireless network may exchange information (which includes data, scheduling and control information, channel feedback information, etc.) with one another via a base station in the network over a communication channel or link (e.g., an RF channel) between the base station and the wireless terminals. The wireless network 28 may be a dense network with a large number of wireless terminals operating therein. For ease of illustration, only one such device 22 is shown in FIG. 3. The carrier network 28 may support stationary as well as mobile devices. The mobile communication network 28 may be a cellular carrier network operated, managed, and/or owned by a wireless service provider (or operator).

The base station 20 may be, for example, a base station or a Radio Base Station (RBS) in a Third Generation (3G) network, or an evolved Node-B (eNodeB or eNB) when the carrier network is a Third Generation Partnership Project's (3GPP) Long Term Evolution (LTE) network. In other embodiments, the base station 20 may also include a site controller, a Base Station Controller (BSC), an access point (AP), a radio tower, or any other type of radio interface device capable of operating in a wireless environment. In addition to providing air interface or wireless channel, such as the one represented by the wireless link 30, to the device 22 via antenna 32, the communication node (or base station) 20 may also perform radio resource management as, for example, in case of an eNodeB in an LTE system.

In case of a 3G carrier network 28, the base station 20 may include functionalities of a 3G base station along with some or all functionalities of a 3G Radio Network Controller (RNC). Various base stations—whether 3G base stations or base stations in other types of carrier networks such as, for example, Fourth Generation (4G) networks and beyond—may be configured as discussed below to implement at least a portion of the high data rate content delivery solution according to particular embodiments of the present disclosure. For example, in one embodiment, the base station 20 may be configured (in hardware, via software, or both) to implement at least a portion of the high bitrate streaming methodology as discussed herein. For example, when existing hardware architecture of the base station 20 cannot be modified, the high bitrate streaming solution according to one embodiment of the present disclosure may be implemented through suitable programming of one or more processors and/or schedulers such as, for example, processor 87 (or, more particularly, the processing unit 93) and scheduler 96 in the base station 20 in the embodiment of FIG. 9. The execution of the program code, for example by a processor and/or scheduler in the node 20, may cause the processor and scheduler to perform appropriate method steps illustrated in FIG. 4 and discussed in further detail with reference to FIGS. 6-7 later below.

The base station 20 may be part of an Access Network (AN) (not shown) portion of the carrier network 28. The AN may be a 3GPP cellular AN or an International Mobile Telecommunication (IMT) Radio Access Network (RAN) such as, for example, a Universal Terrestrial Radio Access Network (UTRAN), an Evolved-UTRAN (E-UTRAN), a GSM/EDGE RAN (GERAN) (where "GSM" refers to Global System for Mobile communications and "EDGE" refers to Enhanced Data Rate for GSM Evolution systems), a Worldwide Interoperability for Microwave Access (WiMAX) network, and the like. In case of a 3G RAN, for example, the base station 20 may include cellular backhaul (not shown) having functionalities of a 3G Radio Network Controller (RNC) or Base Station Controller (BSC). The base station 20 and some of the portions of its backhaul, such as, for example, a BSC or an RNC, may be considered to comprise the RAN portion of the network.

In case of cellular access, the term "access network" may include not only a RAN portion (comprising, for example, a base station with or without a base station controller) of a cellular carrier network, but other portions such as, for example, cellular backhaul and core network, as well. As is understood, a cellular AN may include multiple cell sites, each under the radio coverage of a respective Base Station (BS) or Base Transceiver Station (BTS). However, for ease of illustration, only a single cell site—i.e., the macro cell 10—is shown in FIG. 2 and discussed herein. Similarly, for ease of illustration, only two exemplary "small cells" 12 and 14 are shown in FIG. 2. In practice, the number of small cells in a macro cell in the carrier network 28 may be more or less than two depending on a particular cell site implementation.

The carrier network 28 may include a network controller 34 coupled to the base station 20 and providing logical and control functions such as, for example, terminal mobility management; access to external networks or communication entities; subscriber account management, billing, delivery of streamed video content, etc.; Internet Protocol (IP) connectivity and interconnection to other networks (e.g., the Internet) or entities; roaming support; etc. In case of an LTE carrier network, the network controller 34 may be a Core Network (CN), which may include some or all functionalities of an Access Gateway (AGW) or an Evolved Packet Core (EPC). In certain embodiments, the CN 34 may be, for example, an International Mobile Telecommunications (IMT) CN such as a 3GPP CN. In other embodiments, the CN 34 may be, for example, another type of IMT CN such as a 3GPP2 CN (for Code Division Multiple Access (CDMA) based cellular systems), or an ETSI TISPAN (European Telecommunications Standards Institute TIPHON (Telecommunications and Internet Protocol Harmonization over Networks) and SPAN (Services and Protocols for Advanced Networks)) CN.

Regardless of the type of the carrier network 28, the network controller 34 may function to provide connection of the base station 20 to other wireless terminals (not shown) operating in the carrier network 28 and also to other communication devices such as, for example, wireline or wireless phones, computers, monitoring units, etc., or resources (e.g., an Internet website) in other voice and/or data networks (not shown) external to the carrier network 28. In that regard, the network controller 34 may be coupled to a packet-switched network 36 such as, for example, an IP network or the Internet, as well as a circuit-switched network 38 such as, for example, the Public-Switched Telephone Network (PSTN), to accomplish the desired connections beyond the carrier network 28.

The carrier network 28 may be a cellular telephone network, a Public Land Mobile Network (PLMN), or a non-cellular wireless network (whether voice network, data network, or both). In one embodiment, the carrier network 28 may include multiple cell sites—one of which is shown as the macro cell 10 in FIG. 2. A wireless terminal—i.e., the UE 22—may be a subscriber unit in the carrier network 28. Furthermore, portions of the carrier network 28 may include, independently or in combination, any of the present or future wireline or wireless communication networks such as, for example, the PSTN, an IP Multimedia Subsystem (IMS) based network, or a satellite-based communication link. Similarly, as also mentioned above, the carrier network 28 may be connected to the Internet via its core network's 34 connection to the IP network 36 or may include a portion of the Internet as part thereof. In one embodiment, the wireless network 28 may include more or less or different types of functional entities than those shown in FIG. 3.

The teachings of the present disclosure may apply to many different types of wireless networks 28 (cellular or non-cellular) such as, for example, IP-based 3GPP/3GPP2 cellular networks (including LTE networks), Wireless Fidelity (WiFi) networks, WiMAX systems, International Mobile Telecommunications-Advanced (IMT-Advanced) systems such as, for example, LTE Advanced systems, etc., where streaming of multimedia content to network-based wireless devices is offered by the network.

Figure 9:
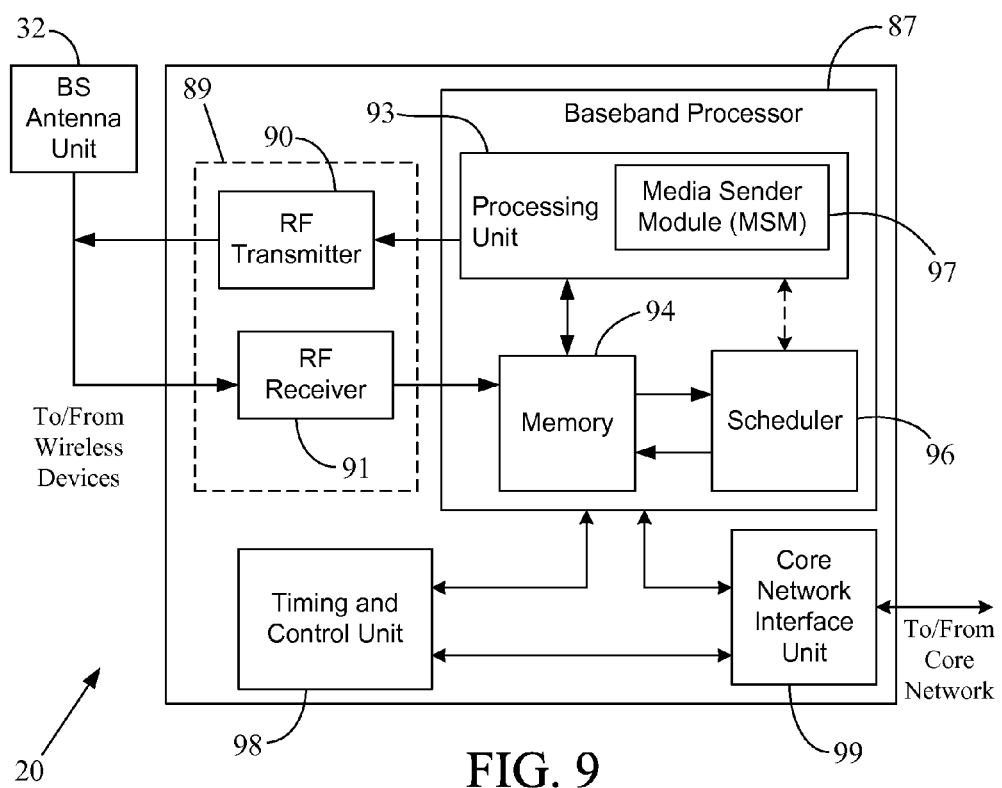
FIG. 9 depicts an exemplary block diagram of a base station that may function as a network entity according to one embodiment of the present disclosure.

In the discussion below, various actions, as shown, for example, in FIG. 4 according to the teachings of one embodiment of the present disclosure, are described to be performed by a "network entity" in the operator network 28 as part of providing high data rate streaming of multimedia content. Although FIGS. 2-3 and 9 depict a single base station (e.g., the macro base station 20) as an example of such a "network entity" and although the discussion below primarily refers to a base station or an eNB as such a "network entity," it is understood that in certain embodiments the term "network entity" may refer to a macro base station operating in conjunction with a secondary entity such as a pico or femto base station, a secondary entity such as a pico or femto base station, a group of base stations, an RNC, a BTS (with or without the functionalities of a BSC), a core network, a BSC, or a combination of one or more base stations (with or without the functionalities of a BSC or an RNC) and a CN. For example, in an LTE network, an eNB may be configured to perform the functions of a "network entity" discussed herein. Similarly, when certain RNC functionalities are implemented in a CN, the CN may represent the "network entity" described herein. If the RNC functionality according to particular embodiments of the present disclosure is distributed between a BS and a CN, then the "network entity" may be a combination of such a BS and CN. On the other hand, in particular embodiments, a combination of multiple base stations (e.g., base stations 20 and 21 in FIG. 2) or a single BS and some other node(s) (not shown) may constitute the "network entity" discussed herein. Another entity (which may be IP-based) in the network 28 other than those mentioned above may be configured to perform as a "network entity" as per the teachings of the present disclosure. Furthermore, in the discussion below, although the network entity may be referred to as "performing," "accomplishing," or "carrying out" a function or process, such performance may be technically accomplished in hardware and/or software as desired.

Figure 4:
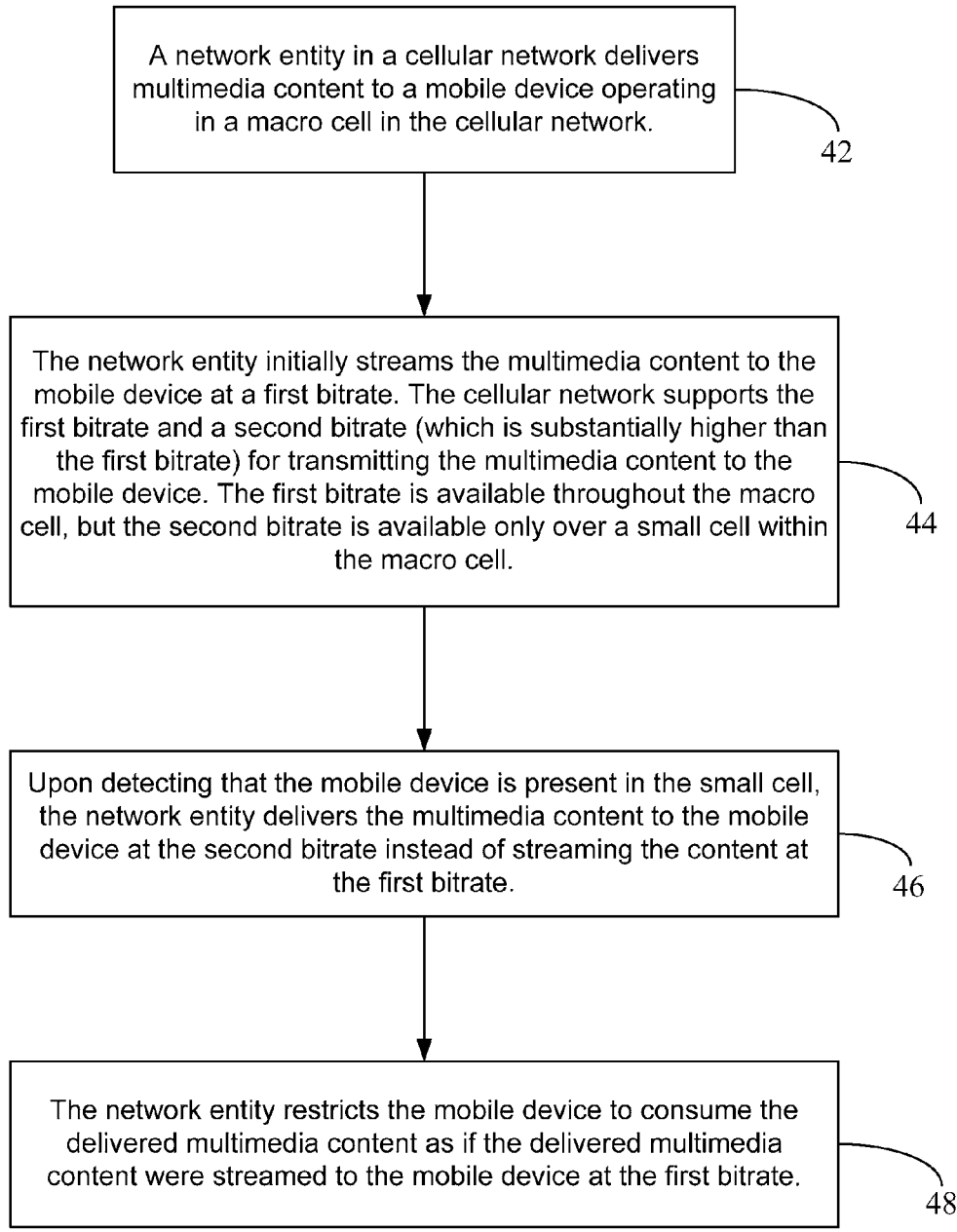
FIG. 4 is an exemplary flowchart depicting detailed steps of how a network entity may provide multimedia content to a wireless device in a cellular network as per the teachings of one embodiment of the present disclosure.

FIG. 4 is an exemplary flowchart 40 depicting detailed steps of how a network entity, such as, for example, the network entity 20 in FIG. 3, may provide multimedia content to a wireless device, such as, for example, the UE or wireless device 22 in FIG. 3, in a cellular network, such as, for example, the carrier network 28 in FIG. 3, as per the teachings of one embodiment of the present disclosure. The flowchart 40 in FIG. 4 is a general depiction of the process of delivering high data rate streaming content to a mobile device. Additional details of this content delivery approach according to the teachings of the present disclosure are provided in the context of FIGS. 5-7.

As shown at block 42 in FIG. 4, the network entity 20 in the cellular network 28 may be configured to deliver multimedia content to the mobile device 22 operating in a macro cell in the network 28. The macro cell may be a terrestrial area, such as, for example, the macro cell 10 in FIG. 2, that is under the radio coverage of the network entity 20 (which may include a single base station or a combination of base stations and/or other network elements as noted before). Initially, the network entity 20 may stream the multimedia content to the mobile device 22 at a first bitrate (block 44). The cellular network 28 may support the first bitrate as well as a second bitrate, which is substantially higher than the first bitrate. The first bitrate may be the streaming bitrate available throughout the macro cell, but the second bitrate may be available only over a second terrestrial area within the macro cell 10. As shown in FIG. 2, the second terrestrial area may be a "small cell", such as, for example, any of the small cells 12, 14, within the macro cell 10. As noted earlier, these small cells 12, 14 may support significantly higher data rates (e.g., up to 10 Gbits/s) for content delivery than the highest streaming rate (e.g., 10 Mbits/s) generally available over the macro cell 10. The lower streaming bitrate may be available throughout the macro cell 10—including over the small cells 12, 14, but the higher data rate may only be available to a wireless device when the wireless device is capable to support such higher data rate and can attach to or communicate with a small cell 12, 14.

As indicated at block 46 in FIG. 4, upon detecting that the mobile device 22 is present in the small cell 14, the network entity 20 may deliver the multimedia content to the mobile device 22 at the second (higher) bitrate supported by the small cell 14 instead of streaming the content to the mobile device at the first (lower) bitrate. However, to prevent misuse of the content delivered at the high data rate, the network entity 20 may restrict the mobile device 22 to consume the delivered multimedia content as if the content were streamed to the mobile device at the first (streaming) bitrate, as indicated at block 48 in FIG. 4. In particular embodiments of the present disclosure, such restriction may be enforced using a two-stage scrambling approach discussed later below with reference to FIGS. 5-7. In this manner, streaming-related legal restrictions may be maintained on the consumption of the content even though the content is delivered at a high data rate.

In one embodiment, the network entity 20 may infer UE's 22 location based on UE's communication with the small cell 14 such as, for example, the signaling between the small cell 14 and the UE 22 when the UE attaches to the small cell, indicating that the UE 22 is receiving relevant control information from the small cell. In alternative embodiments, the network entity 20 may determine that the UE 22 is present within the small cell 14 based on known mobile radio positioning/locating method(s).

Figure 5:
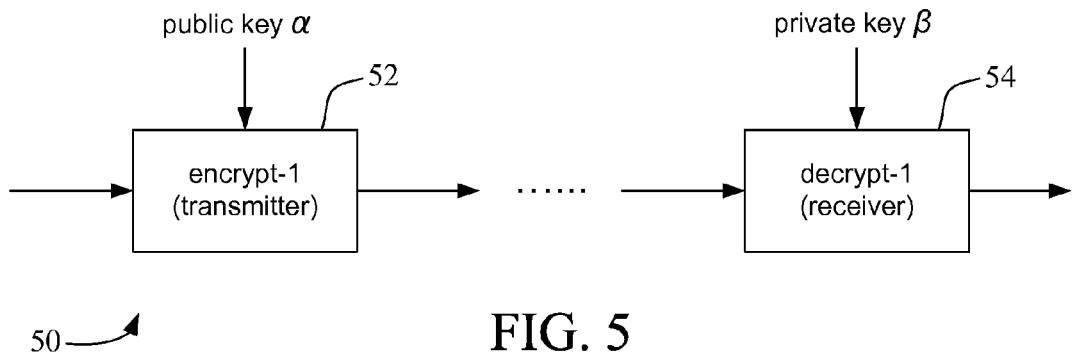
FIG. 5 shows an exemplary single-stage encryption mechanism for streamed content based on a public-key cryptography scheme.
Figure 6:
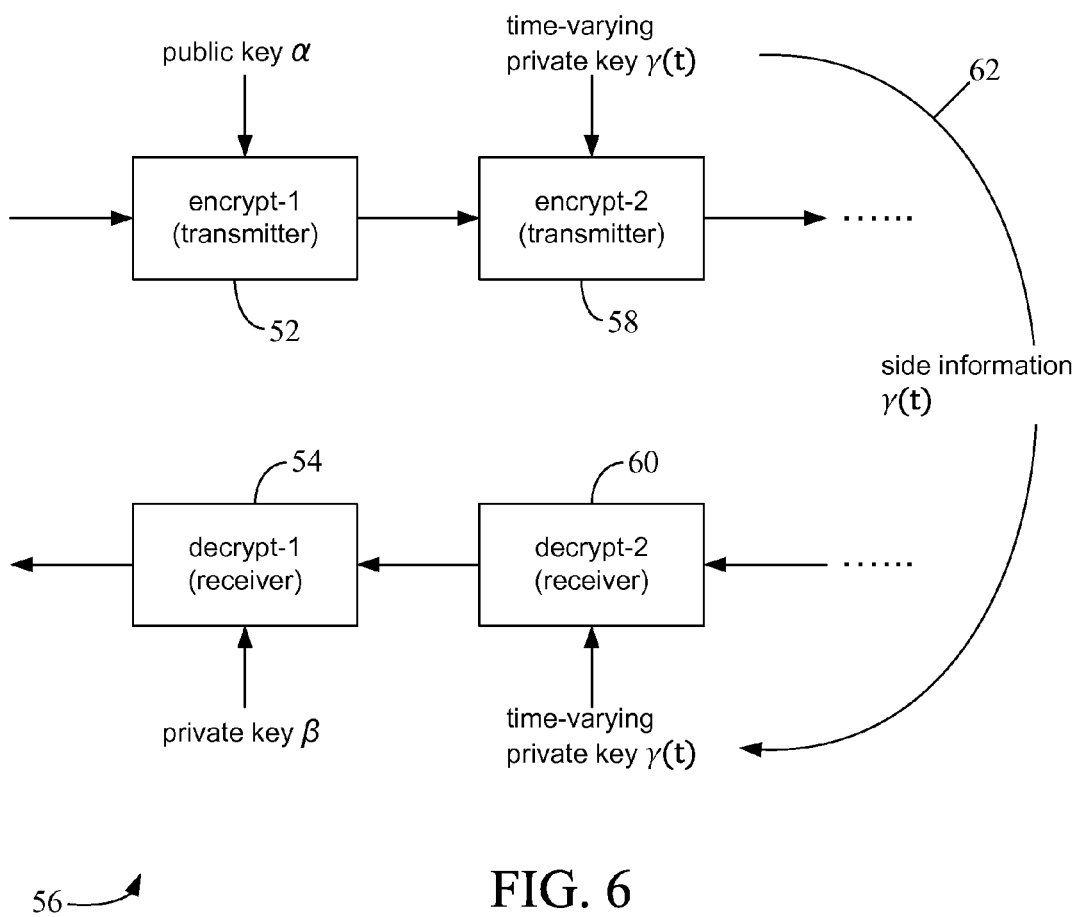
FIG. 6 depicts an exemplary two-stage scrambling system according to one embodiment of the present disclosure in which the first stage uses a public/private cryptography scheme, whereas the second stage uses a private cryptography scheme in which a time-varying cryptography key is used to control the timing of decryption (in the receiver)
Figure 7:
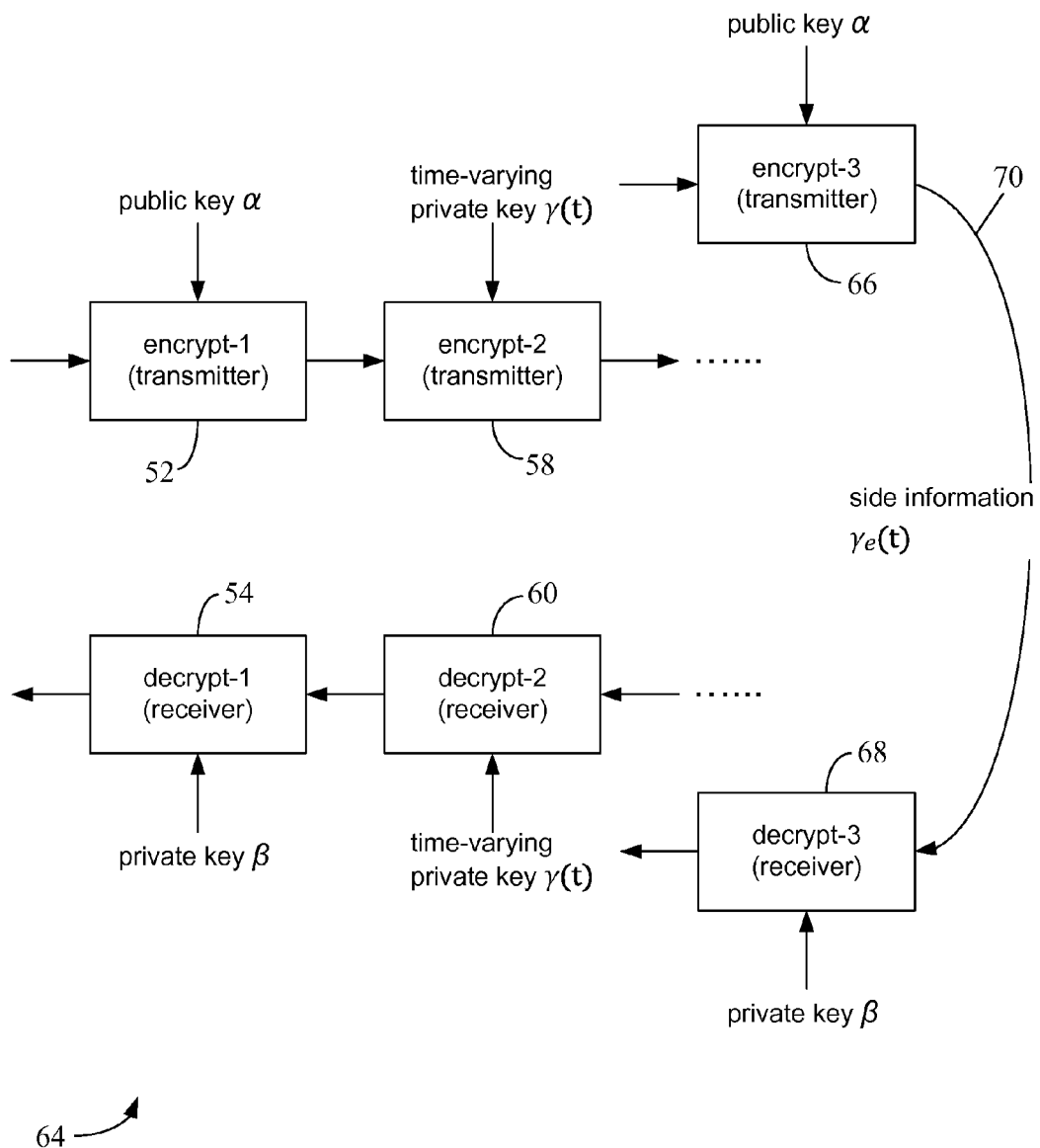
FIG. 7 illustrates an exemplary scrambling system according to one embodiment of the present disclosure where the two-stage scrambling system of FIG. 6 is enhanced with an additional scrambling stage to scramble the side information as well.

FIG. 5 shows an exemplary single-stage encryption mechanism 50 for streamed content based on a public-key cryptography scheme. In the discussion of FIGS. 5-7, any delay between a server of the streamed content and a client/receiver of the streamed content is ignored for ease of discussion. The content server may be the network entity 20 itself or another remote entity such as, for example, a core network-based entity or an Internet-based remote server in communication with the network entity 20. In one embodiment, the content server (not shown) may be under control of the content provider, which may offer/license the content to the operator of the network 28 for streaming to client mobile devices, such as the UE 22, operating in the network 28. In particular embodiments, the network entity 20 may be considered as a "transmitter" of the multimedia content, whereas the UE 22 may be considered as the "receiver" of such content.

Of course, in reality, it may be desirable to account for all delays occurring along the way—i.e., from the server of the multimedia content to the receiver of that content. Such delays may include, for example, processing delays at the server, transmitter, and receiver side; backhaul delay if the server is remote from the transmitter, over-the-air delay during content delivery, etc. However, for simplicity of discussion, such delays are ignored hereinbelow.

Figure 8:
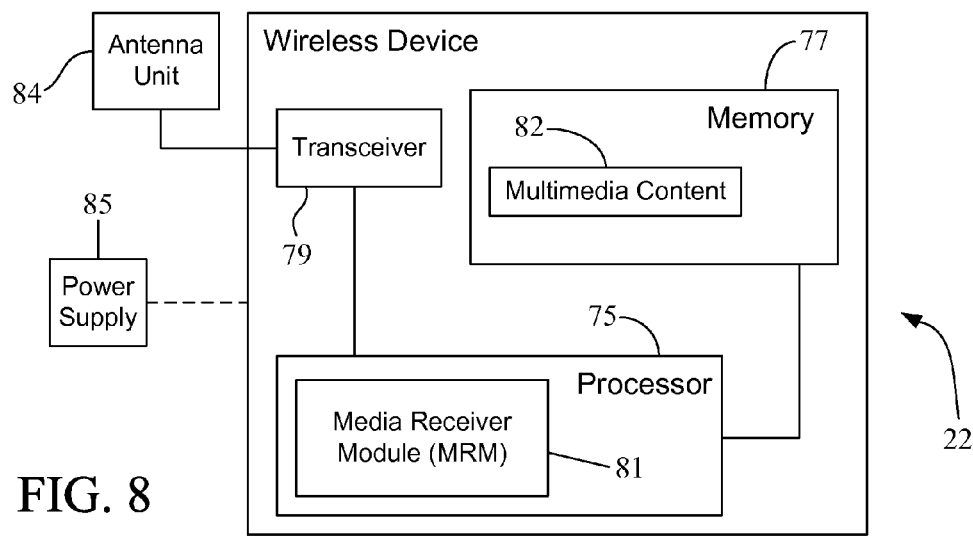
FIG. 8 shows a block diagram of an exemplary wireless device according to one embodiment of the present disclosure.

It is assumed that the information required by the streaming media player such as, for example, the Media Receiver Module (MRM) 81 in FIG. 8, in the client device 22 at a given time "t" is represented by a message m(t). In the baseline (or general) scenario of FIG. 5, the transmitter may scramble the clear (or original) message m(t) and send it to the client's media player to de-scramble it inside the player's sandbox and reconstruct the content associated with the time instance "t". The message m(t) may represent a small time section of the total multimedia content being streamed to the client media player.

In one embodiment, a public-key cryptography scheme that uses two different "keys" may be used by the transmitter (e.g., the network entity 20) to scramble the messages in the multimedia content being streamed to the mobile device 22. A "key" is a piece of information or parameter that determines the functional output of a cryptography system. The public-key cryptography scheme is an asymmetric cryptography in that it uses two separate keys, one of which is secret (or private) and one of which is public. The public key may be widely distributed, while the private key is kept secret—i.e., it is known only to its recipient. The public and private keys may be related mathematically, but the parameters are chosen so that calculating the private key from the public key may be either impossible or prohibitively expensive. Messages may be encrypted using the intended recipient's public key, but can only be decrypted using that recipient-specific private key. There are many public/private key cryptography systems of various complexity and security levels. Any of those systems may be used for the single stage of encryption mechanism in FIG. 5 and for the first stage of encryption mechanism in FIGS. 6-7.

Referring again to FIG. 5, at the transmitter (e.g., the network entity 20), at time t, a public encryption key function "E" may be used to scramble the message m(t) as indicated at block 52. The scrambled message may be represented as:

$$m_e(t) = E(m(t), \alpha) \qquad (1)$$

In the equation (1) above, "$\alpha$" is a public key known at the transmitter and specified for the particular receiver—here, the wireless device 22. At the receiver, a decryption function "D" may be used, such as, for example, by the receiver's streaming media player, to de-scramble $m_e(t)$ inside the media player's sandbox. The resulting "clear" message m(t) may be represented as:

$$m(t) = D(m_e(t), \beta) \qquad (2)$$

In the equation (2) above, "$\beta$" is a private key known only at the particular receiver. This decryption operation is symbolically represented by block 54 in FIG. 5.

Once m(t) is "consumed" by the media player at time t, $m_e(t)$ and m(t) are erased from the media player's memory, for example, to comply with content owner's streaming-related legal restrictions (as discussed before). At time "t+1", the next scrambled message $m_e(t+1)$ arrives at the client device, is de-scrambled there to obtain its corresponding "clear" message m(t+1) in the manner discussed above, and so on.

It is noted here that a content may be considered "consumed" by a client device's media player when the content is played back, such as, for example, in case of an audio, video, or audio-visual content; displayed, e.g., as in case of textual or pictorial content; or otherwise made available to a user of the mobile device 22 in the manner and format intended for the ultimate comprehension of the content by the user.

In particular embodiments of the present disclosure, variants of the baseline approach shown in FIG. 5 may be used. For example, in one embodiment, the streaming mechanism implemented at the transmitter may allow for the last few messages to remain in the memory of the receiver's media player, for example, to enable replay of the most-recent content, etc. The teachings of the present disclosure may be easily extended to accommodate such variants.

As noted before, when the client 22 connects to the small cell 14 with high rate availability, it may be desirable to take advantage of that high rate availability at time "t" and beyond (so long as it is feasible). For simplicity, it may be said that the higher rate translates into the ability of the transmitter (e.g, the network entity 20) to transmit "T" messages at any given time instance instead of one message at the "typical" streaming rate, as contrasted by arrows 19 (FIG. 1B) and 24 (FIG. 2). To do so, in one embodiment, at time t, the transmitter may send T original messages m(t) to m(t+T−1), for example, by scrambling them into corresponding messages $m_e(t)$ to $m_e(t+T-1)$ as per equation (1) and sending them to the receiver through a high data rate download operation.

At the receiver, there are now T scrambled messages available at time t—i.e., messages $m_e(t)$ to $m_e(t+T-1)$. In principle, the client could de-scramble these messages immediately upon receipt and obtain the corresponding clear messages m(t) to m(t+T−1) at time t. Depending on the size of T, the streaming restrictions may be in jeopardy. For example, if the available high rate is 1000 times higher than the required streaming rate, then T would also be of the same order, and the whole content or a significant portion of it would now be simultaneously available at the receiver.

In one embodiment, as a solution to the above problem of client's potentially unrestricted access to the downloaded content, an additional requirement may be put on the client not to de-scramble messages m(t+1) and beyond at time t. However, instead of putting a requirement on the client, in another embodiment, it may be preferable to enforce any such requirement through the structure of the streaming/downloading mechanism, thereby maintaining the same level of control by the content owner. Hence, in particular embodiments of the present disclosure, the ability of the client to de-scramble the received information/messages is made time-dependent by the transmitter, as explained below with reference to discussion of FIGS. 6-7.

FIG. 6 depicts an exemplary two-stage scrambling system 56 according to one embodiment of the present disclosure in which the first stage uses a public/private cryptography scheme, whereas the second stage uses a private cryptography scheme in which a time-varying cryptography key is used to control the timing of decryption (in the receiver). In FIG. 6, the first stage of scrambling is the same as that shown in FIG. 5 and, hence, is represented using the blocks having the same reference numerals "52" and "54", which are marked with the text "encrypt-1" and "decrypt-1", respectively, to denote that these blocks represent the first stage or stage-1 of the two-stage scrambling system. The second of the two stages is represented by blocks 58 and 60, which are marked with the text "encrypt-2" and "decrypt-2", respectively.

In the embodiment of FIG. 6, the ability of the client to de-scramble the received information/messages is made time-dependent when the transmitter withholds some information related to scrambling from the receiver until the appropriate time, thereby preventing the client/receiver from "seeing" the additional messages m(t+1) to m(t+T−1) in the "clear" at time t. In the discussion below, the withheld scrambling information is referred to as "side information."

In the two-stage scrambling process of FIG. 6, the second stage (which is represented by blocks 58, 60) imposes the time restriction on the receiver. As noted, at the transmitter, the first stage of scrambling is the same as in case of FIG. 5. However, in the second stage, a time-varying cryptography scheme is used. In the embodiment of FIG. 6, the second stage is shown to use a private-key cryptography scheme in which the private key is made time-varying and denoted by "γ(t)" for its explicit dependence on "t". This private key is used as the "side information" needed at the receiver to decrypt the message(s), as symbolically illustrated by the arrow 62 in FIG. 6.

It is noted here that a private-key cryptography scheme uses symmetric-key algorithms—i.e., a single secret key is shared and kept private by both the sender and the receiver, for both encryption and decryption. To use a symmetric encryption scheme, the sender and the receiver must securely share a key in advance. On the other hand, as noted before, the public-key cryptography in FIG. 5 and in the first stage of FIG. 6 uses asymmetric key algorithms, where the key used to encrypt a message is not the same as the key used to decrypt it. There are many private-key cryptography systems, any of those may be used for the second stage of encryption/decryption mechanism in FIGS. 6-7.

In the double-scrambling approach shown in the embodiment of FIG. 6, the scrambled message $m_e(t)$ at the output of the block 52 is scrambled a second time at block 58 with a private encryption function $E_2$. The output of the block 58 may be given by:

$$m_{e2}(t)=E_2(m_e(t),\gamma(t)) \qquad (3)$$

In the equation (3) above, γ(t)—i.e., the time-varying private key—is specified for the particular receiver (here, the mobile device 22). Similarly, the private key γ(t+1) is used for $m_e$(t+1), and so on. Then, at time t, $m_{e2}(t)$ to $m_{e2}(t+T-1)$ messages are sent to the receiver. In addition, only the current side information γ(t) associated with the message $m_{e2}(t)$ is sent at time t as indicated by arrow 62 in FIG. 6. No other remaining side information—i.e., γ(t+1) to γ(t+T−1)—is sent to the receiver at the time instance t.

At the receiver, in the first stage 60, $m_{e2}(t)$ is descrambled with a private key decryption function $D_2$, using the corresponding private key γ(t) as given below:

$$m_e(t)=D_2(m_{e2}(t),\gamma(t)) \qquad (4)$$

The resulting message $m_e(t)$ in equation (4) is then de-scrambled in the second stage 54 of the receiver to obtain the clear message m(t), using the public/private decryption function D as given in equation (2) before.

It is observed from the above that, at time t, the remaining messages $m_{e2}(t+1)$ to $m_{e2}(t+T-1)$ cannot be descrambled in the first stage 60 of the receiver because their respective side information γ(t+1) to γ(t+T−1) is not available at the receiver yet.

At time t+1, however, the transmitter (e.g., the network entity 20) sends side information γ(t+1) to the receiver, thereby enabling the receiver to de-scramble only $m_{e2}(t+1)$, which is already transmitted to the receiver at the earlier time instance t. If the client device 22 is still in the high rate mode (e.g., through its attachment to the small cell 14) at time instance t+1, then the transmitter may also send the next T scrambled messages $m_{e2}(t+T)$ to $m_{e2}(t+2T-1)$ to the receiver at time instance t+1 along with the side information γ(t+1). At time instance t+2, the transmitter would send the side information γ(t+2) and, possibly, the next batch of T scrambled messages—i.e., messages $m_{e2}(t+2T)$ to $m_{e2}(t+3T-1)$. In this manner, the transmitter would temporally sequentially supply a plurality of time-varying decryption keys to the mobile device as part of the time-varying cryptography scheme, wherein each decryption key in the plurality of time-varying decryption keys is configured to de-scramble only a key-specific portion of the messages in the downloaded multimedia content and is supplied to the mobile device only when a time instance associated with that decryption key occurs.

Of course, this accelerated transmission of different batches of T scrambled messages may cause the client to run out of memory, eventually. Then, in one embodiment, the transmitter may pause the message transmissions until enough memory is available, while still sending the side information at the right time—i.e., in the time-wise sequential manner noted above.

In particular embodiments, each of the second (i.e., γ(t+1)) and subsequent decryption keys is supplied to the mobile device at appropriate time instance regardless of whether additional multimedia content is delivered to the mobile device along with the decryption key—i.e., regardless of whether any additional multimedia content is delivered at time instances t+1 and beyond.

It is noted here that at least one of the plurality of time-varying keys used in the private-key cryptography scheme in the second stage of scrambling (i.e., block 58 in FIG. 6) may be unique to the receiver—i.e., the mobile device 22.

In one embodiment, the same private key may be used to de-scramble some other message eventually, but the receiver does not know when. Thus, for a future time instance t'(t<t'), such recurrence may be indicated as: γ(t')=γ(t). This may be fine so long as the receiver does not know about it in advance. Hence, when the receiver receives a private key at a given time instance, it is not known to the receiver to use that private key to de-scramble any message other than the message associated with the private key (e.g., message $m_{e2}(t)$ associated with key $\gamma(t)$, message $m_{e2}(t+1)$ associated with key $\gamma(t+1)$, etc.) at that specific time instance. Thus, the received private key is "useless" for the receiver when it comes to de-scrambling any message other than the key-specific message at the relevant time instance or later. Consequently, the receiver will not be able to "misuse" the private key to unscramble more than one message. In one embodiment, such restriction on the receiver's ability to de-scramble a message allows the transmitter to instruct the receiver to use a key from an earlier time, assuming that the receiver device keeps or stores a certain number of old keys. For example, the message at time t' may instruct the receiver to use the key from time t, where t<t' and where it is assumed that the device has stored the key associated with time instance t.

In particular embodiments, if the client device 22 leaves the small cell 14, then the transmitter (e.g., the network entity 20) may pause or cease any further transmission of multimedia content until the extra received messages (at the higher data rate) are substantially consumed in the client. As noted, the transmitter may, however, continue to send to the receiver—in the temporally sequential manner—any time-varying decryption keys that are still pending to be sent. Thereafter, the transmitter may revert to the original single scrambling scheme (of FIG. 5) for streaming of subsequent multimedia content to the mobile device at the lower bitrate. As discussed earlier, the original scrambling scheme of FIG. 5 does not require transmission of any side information. Hence, the transmitter and receiver can now resume routine streaming at the lower bitrate. In one embodiment, the transmitter and the receiver may communicate explicitly which scrambling mode they are in. In another embodiment, the scrambling mode may be inferred from the current bit rate.

In one embodiment, the network entity 20 may commence the streaming-based subsequent transmission of multimedia content after the content delivered at the high data rate is substantially consumed in the mobile device 22. The network entity may determine, based on its communication with the mobile device, whether the content delivered at the high data rate is substantially consumed in the mobile device. For example, the mobile device may inform the network entity of the mobile device's memory status on a schedule, or only when it is close to empty or close to full. Alternatively, the network entity may poll the device on a schedule, or when the network entity knows that the device has received a chunk of content at high rate and has been consuming it. In one embodiment, the network entity may infer how long it would take for the mobile device to consume a pre-determined number (e.g., 80% or 90%) of multimedia messages for the delivered content to be considered "substantially consumed." For example, based on the total number of messages downloaded onto the mobile device, the latest decryption key sent to the mobile device and the number of decryption keys still pending to be sent to the mobile device, and the "typical" message consumption rate for streamed content, the network entity may infer when the mobile device may end up consuming a specific amount of delivered content.

Alternatively, when the mobile device 22 leaves the small cell 14, the transmitter may continue to transmit at the normal streaming rate of one message at a time, even though there are extra received messages still pending to be consumed in the mobile device 22. In this case, the transmitter may continue to use the double-scrambling scheme of FIG. 6 even when streaming one message at a time, and send the time-varying side information at the right time. Thus, in one embodiment, the two-stage cryptography and time-varying decryption keys according to the embodiment of FIG. 6 may be used even when sending content streamed at the lower bitrate.

In general, private key cryptography systems may be susceptible to the private key being stolen from the transmitter. In the embodiment of FIG. 6, the time-varying private key $\gamma(t)$ is the side information, and new values are sequentially being sent to the receiver at every different time instance. It is conceivable that the time-varying decryption keys $\gamma(t), \gamma(t+1)$, etc., in the embodiment of FIG. 6 may also be intercepted over the air. However, that may not be a problem for two reasons. First, it is observed that $\gamma(t)$ is useful to the receiver for one message only, so its value is very limited. Second, there is still a second stage of scrambling with the public/private key cryptography system. Thus, if the interceptor doesn't also know the private key A all it has obtained is a still-scrambled message $m_e(t)$.

In the event that an added layer of privacy is desired to secure the side information $\gamma(t)$, it may be scrambled using a public/private key cryptography system. FIG. 7 illustrates an exemplary scrambling system 64 according to one embodiment of the present disclosure where the two-stage scrambling system 56 of FIG. 6 is enhanced with an additional scrambling stage to scramble the side information. The additional scrambling stage is represented by blocks 66, 68 in FIG. 7. Thus, in FIG. 7, the first stage (blocks 52, 54) uses a public/private cryptography system, the second stage (bocks 58,60) uses a private cryptography system, and the additional stage (blocks 66, 68) also uses the public/private cryptography system to scramble each time-varying private key $\gamma(t)$. As shown at arrow 70 in FIG. 7, the scrambled key $\gamma_e(t)$ (which is given by equation (5) below) may be then used as "side information" to control the time of decryption.

In one embodiment, for simplicity of notation, the public/private key cryptography system may be that shown in FIG. 5 and may be the same for the first stage (blocks 52, 54) as well as for the additional stage (blocks 66, 68). Thus, for the block 66 at the transmitter, at time t, $\gamma(t)$ is scrambled into:

$$\gamma e(t)=E(\gamma(t),\alpha) \qquad (5)$$

and sent to the receiver at time t. At the block 68 in the receiver, $\gamma_e(t)$ is de-scrambled inside the receiver's sand box (not shown) into:

$$\gamma(t)=D(\gamma_e(t),\beta) \qquad (6)$$

Then, in the receiver, $\gamma(t)$ can be used in the first stage of decryption (i.e., block 60) to de-scramble $m_{e2}(t)$ as discussed hereinbefore.

FIG. 8 shows a block diagram of an exemplary wireless device 22 according to one embodiment of the present disclosure. As noted earlier, the mobile or wireless device 22 may be a UE, an Access Terminal (AT), or any other wireless device operating in a carrier network (such as the network 28 in FIG. 3). The wireless device 22 may include a processor 75, a memory 77 (which may, in some embodiments, also include memory on UE's Subscriber Identity Module (SIM) card), and a transceiver 79. The processor 75 may include a Media Receiver Module (MRM) 81, which may include program code for a streaming media player as well as program code for de-scrambling of scrambled messages received from a network entity (e.g., the base station 20 in FIG. 3) in the carrier network 28. Upon execution of the program code of the MRM 81 by the processor 75, the processor may configure the wireless device 22 to perform various content playback-related tasks such as, for example, receiving the streamed or downloaded multimedia content and time-varying decryption keys from the network entity, displaying the played video content on a device display, requesting additional multimedia content when a playback buffer starts to empty, de-scrambling the received messages using message-specific time-varying decryption keys, etc.

The memory 77 may store data or other related communications received from the network entity 20. For example, in one embodiment, the memory 77 may store the scrambled multimedia messages received from the base station 20 via a high data rate download. These messages may be later used by the processor 75 to playback the received multimedia content using the MRM 81. Some "clean" multimedia messages may get stored in the memory 77, for example, by the MRM 81, during playback of the multimedia content. The block 82 represents the scrambled as well as de-scrambled or clean multimedia content that may get stored in the memory 77.

The transceiver 79 may communicate with the processor 75 to perform transmission/reception of data, control, or other signaling information (via an antenna unit 84) to/from the network entity with which the wireless device 22 may be in communication. The transceiver 79 may be a single unit or may comprise of two separate units—a transmitter (not shown) and a receiver (not shown). The antenna unit 84 may include one or more antennas. Alternative embodiments of the wireless device 22 may include additional components responsible for providing additional functionality, including any of the functionality identified herein, such as, for example, receiving multimedia content from a network entity through streaming as well as download, playing or consuming the received content, attaching to a small cell, de-scrambling a multimedia message using its corresponding time-varying decryption key, communicating the current scrambling mode with the network entity, etc., and/or any functionality necessary to support the solution as per the teachings of the present disclosure. For example, in one embodiment, the wireless device 22 may also include an on-board power supply unit 85 (e.g., a battery or other source of power) to allow the device to be operable in a mobile manner.

In one embodiment, the wireless device 22 may be configured (in hardware, via software, or both) to implement device-specific aspects of content reception (via streaming as well as downloading) and playback (after necessary de-scrambling) as per teachings of the present disclosure. The software or program code may be part of the MRM 81 and may be stored in the memory 77 and executable by the processor 75. For example, when existing hardware architecture of the device 22 cannot be modified, the functionality desired of the device 22 may be obtained through suitable programming of the processor 75 using the MRM 81. The execution of the program code (by the processor 75) may cause the processor to perform as needed to support the high data rate multimedia streaming solutions as per the teachings of the present disclosure. Thus, although the wireless device 22 may be referred to as "performing," "accomplishing," or "carrying out" (or similar such other terms) a function or a process or a method step, such performance may be technically accomplished in hardware and/or software as desired. The network operator or a third party, such as, for example, a manufacturer or supplier of the device 22, may suitably configure the device 22, for example, through hardware and/or software based configuration of the processor 75, to operate and reciprocate with the network entity (e.g., the base station 20) as per the particular requirements of the present disclosure discussed above. As a result, the mobile device 22 may experience steady, uninterrupted playback of the network-delivered multimedia content.

FIG. 9 depicts an exemplary block diagram of a base station (e.g., the base station 20 in FIG. 3) that may function as a network entity according to one embodiment of the present disclosure. In one embodiment, the base station 20 may be an eNB. In one embodiment, the base station 20 may be configured to perform various functionalities of the network entity discussed earlier with reference to FIGS. 4-7. Thus, for example, the base station 20 may be configured to perform two-stage scrambling and, hence, restrict the media receiver such as the mobile device 22 to playback multimedia content without violating streaming-related legal restrictions, as discussed with reference to FIGS. 4-7. The base station 20 may be configured to further perform streaming or downloading of multimedia content as needed, and transmission of time-varying decryption keys, as per the embodiments of FIGS. 4-7. The base station 20 may or may not use a secondary entity such as, for example, the pico base station 21 in FIG. 2, to perform some or all of such tasks. In certain embodiments, the secondary entity itself may have the architecture illustrated in FIG. 9.

The base station 20 may include a baseband processor 87 to provide radio interface with the wireless devices (e.g., the mobile device 22 in FIGS. 3 and 8) via base station's Radio Frequency (RF) transceiver unit 88 coupled to the base station's antenna unit 32. The transceiver unit 88 may include RF transmitter 90 and RF receiver 91 units coupled to the antenna unit 32 as shown. In one embodiment, the processor 87 may receive transmissions (e.g., uplink and/or downlink channel condition related information, small cell attachment reports, geographical location information, requests for multimedia content, etc.) from the wireless device 22 via the combination of the antenna unit 32 and the receiver 91, whereas the base station's transmissions (e.g., streaming or downloading of scrambled multimedia content, transmissions of time-varying decryption keys, a query for a mobile device's geographical location information, scheduling-related messages, etc.) to the wireless device 22 may be carried out via the combination of the antenna unit 32 and the transmitter 90.

The processor 87 may be configured (in hardware and/or software) to perform various actions mentioned above as well as discussed with reference to FIGS. 2-7. In that regard, the processor 87 may include a processing unit 93 coupled to a memory 94 and a scheduler 96 to enable the processor 87 to perform various steps illustrated in FIGS. 4-7 and discussed in detail hereinbefore. In one embodiment, the memory 94 may be a separate unit—i.e., not an internal part of the processor 87 (as in FIG. 9), but coupled to it to provide requisite storage. In another embodiment, the memory 94 may function as a storage of multimedia content received from various content providers for distribution—e.g., via streaming or downloading—to client devices in the operator's network 28. The memory 94 may contain program code that, upon execution by the processing unit 93, may configure the processor 87 to perform various steps discussed hereinbefore with reference to FIGS. 4-7. The processing unit 93 may include a Media Sender Module (MSM) 97 that may also contain program code, which, in conjunction with the program code in the memory 94, may configure the processor 87 to perform the multimedia content delivery according to particular embodiments of the present disclosure. For example, through the MSM 97, the processing unit 93 may execute appropriate program code to double-scramble multimedia content when downloading the content at a high data rate to a mobile device (e.g., the mobile device 22) in a small cell, monitor the mobile device's current location and determine if the mobile device has attached to a small cell, transmit appropriate decryption keys to the mobile device in a temporally sequential manner, switch between streaming and downloading of multimedia content depending on the mobile device's operational capacity and location within a macro cell, etc. The processing unit 93 may be in communication with the memory 94 to process and store relevant information for the corresponding cell site (e.g., identities of UEs or wireless devices operating within the cell, channel condition reports and/or small cell attachment reports received from wireless devices, location information and/or scrambling mode-related information received from UEs playing network-delivered multimedia content, etc.).

A scheduler (e.g., the scheduler 96 in FIG. 9) may be part of the base station's processor 87 and may provide the Uplink (UL) and Downlink (DL) scheduling decisions for the wireless device 22 based on a number of factors such as, for example, QoS (Quality of Service) parameters, device buffer status, UL and DL channel condition related information received from device, device capabilities, etc. In one embodiment, the network entity 20 may include separate UL and DL schedulers (not shown in FIG. 9) as part of its baseband processor 87. The scheduler 96 may have the same data structure as a typical scheduler in an eNB in an LTE system. The processor 87 may also provide additional baseband signal processing (e.g., mobile/wireless device registration, channel signal information transmission, radio resource management, etc.) as required. The processing unit 93 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. The processor 87 may employ distributed processing in certain embodiments.

Some or all of the functionalities described above and earlier with reference to FIGS. 2-7 as being provided by a network entity (such as a base station, a wireless access node/point, a base station controller, and/or any other type of mobile communications node) may be provided by the processing unit 93 executing instructions stored on a computer-readable data storage medium, such as the memory 94 shown in FIG. 9.

The network entity 20 in the embodiment of FIG. 9 may further include a timing and control unit 98 and a core network interface unit 99. The control unit 98 may monitor operations of the processor 87 and the network interface unit 99, and may provide appropriate timing and control signals to these units. The interface unit 99 may provide a bi-directional interface for the base station 20 to communicate with its core network (or other network-based control entity) to facilitate administrative and call/data-management functions for mobile subscribers operating in the corresponding cell site of the carrier network (e.g., the operator network 28 in FIG. 3).

Alternative embodiments of the base station 20 may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features and elements. Some or all aspects of the methodology provided herein (related to a double-scrambling based content delivery approach to provide content delivery at a high data rate without violating streaming-related legal restrictions) may be implemented in a computer program, software, or firmware incorporated in a computer-readable storage medium (e.g., the memory 77 in FIG. 8 and/or the memory 94 in FIG. 9) for execution by a general purpose computer or a processor (e.g., the processor 75 in FIG. 8 and/or the processing unit 93 in FIG. 9). Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs). In certain embodiments, the memory 94 may employ distributed data storage with/without redundancy.

The foregoing describes a system and method that address media streaming in a scenario where very high data rate wireless service is occasionally available within a macro cell through small cells. Particular embodiments of the present disclosure exploit the high data rate availability over a small cell in the context of media streaming. When a mobile device is in a small cell within a macro cell, instead of streaming the media at a low (streaming) rate generally supported throughout the macro cell, a base station may deliver the multimedia content to the mobile device at the small cell-supported high data rate. The delivery may be through a media download. However, to prevent the client device from violating any streaming-related legal restrictions in view of the instant availability of a large amount of content through the download, the ability of the device to de-scramble the downloaded information may be made time dependent. Hence, a two-stage scrambling process may be used at the base station to keep the information scrambled until it is ready to be consumed by the client device. The second layer of scrambling is in addition to the single stage of scrambling normally employed during streaming. The base station may withhold from the mobile device some information related to de-scrambling of the received content until the appropriate time. Therefore, even if the client device receives the multimedia content at a high data rate in a small cell, the received content may not be played back or consumed by the client device until "allowed" by the base station. Such withheld information is in the form of time-varying decryption keys, which control the timing of decryption and are supplied to the mobile device in a temporally sequential manner as part of the second stage of scrambling. The content streaming solution according to particular embodiments of the present disclosure thus enables full utilization of small cells for media streaming, and frees up macro cells for other tasks.

In particular embodiments, the teachings of the present disclosure may not have to be implemented strictly in the context of a small cell. For example, generally speaking, whenever a base station detects that a high bitrate is available in the macro cell (whether within a small cell or elsewhere) for transmitting the multimedia content to the mobile device, the base station may utilize the two-stage scrambling process of particular embodiments of the present disclosure to download the multimedia content onto the mobile device at the higher bitrate instead of streaming the content at the lower (streaming) bitrate.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of delivering multimedia content to a mobile device operating in a macro cell in a cellular network that supports a first bitrate and a second bitrate for transmitting the multimedia content to the mobile device, wherein the method comprises performing the following using a network entity in the cellular network:

streaming the multimedia content to the mobile device at the first bitrate, wherein the first bitrate is available throughout the macro cell and wherein the second bitrate is available only over a small cell within the macro cell and is substantially higher than the first bitrate; and upon detecting that the mobile device is present in the small cell, delivering the multimedia content to the mobile device at the second bitrate instead of streaming at the first bitrate.

2. The method of claim 1, wherein delivering the multimedia content includes performing the following using the network entity:

downloading the multimedia content onto the mobile device at the second bitrate.

3. The method of claim 1, wherein delivering the multimedia content includes performing the following using the network entity:

restricting the mobile device to consume delivered multimedia content as if the delivered multimedia content were streamed to the mobile device at the first bitrate.

4. The method of claim 3, wherein restricting the mobile device includes performing the following using the network entity:

scrambling all messages in the delivered multimedia content in a manner similar to scrambling of messages in the multimedia content streamed at the first bitrate;

further scrambling all the messages in the delivered multimedia content using a time-varying cryptography scheme that is different from a cryptography scheme used for scrambling the multimedia content streamed at the first bitrate; and temporally sequentially supplying a first plurality of time-varying decryption keys to the mobile device as part of the time-varying cryptography scheme, wherein each decryption key in the first plurality of time-varying decryption keys is configured to de-scramble only a key-specific portion of the messages in the delivered multimedia content and is supplied to the mobile device only when a time instance associated with that decryption key occurs, thereby restricting the mobile device to consume delivered multimedia content as if the delivered multimedia content were streamed to the mobile device at the first bitrate.

5. The method of claim 4, wherein temporally sequentially supplying the first plurality of time-varying decryption keys includes performing the following using the network entity:

when the multimedia content is delivered to the mobile device at a time instance "t", supplying a first decryption key in the first plurality of time-varying decryption keys to the mobile device along with the delivered multimedia content, wherein the first decryption key is associated with the time instance "t" and is configured to enable the mobile device to de-scramble only a first message that is associated with the time instance "t" in the delivered multimedia content; and after the multimedia content is delivered to the mobile device at the time instance "t":

supplying a second decryption key in the first plurality of time-varying decryption keys at a time instance "t+1," wherein the second decryption key is configured to enable the mobile device to de-scramble only a second message that is associated with the time instance "t+1" in the delivered multimedia content, and temporally sequentially supplying subsequent decryption keys at key-specific time instances "t+2" and beyond until all remaining decryption keys in the plurality of time-varying decryption keys are sent to the mobile device to enable the mobile device to de-scramble only those key-specific messages in the delivered multimedia content that are associated with key-specific time instances.

6. The method of claim 5, wherein each of the second and subsequent decryption keys is supplied to the mobile device regardless of whether additional multimedia content is delivered to the mobile device at time instances "t+1" and beyond.

7. The method of claim 4, wherein at least one of the first plurality of time-varying decryption keys is unique to the mobile device.

8. The method of claim 4, wherein the cryptography scheme used for scrambling the content streamed at the first bitrate is a public-key cryptography scheme, and wherein the time-varying cryptography scheme used for scrambling the multimedia content delivered at the second bitrate is a private-key cryptography scheme.

9. The method of claim 4, further comprising performing the following using the network entity:

scrambling each decryption key in the first plurality of time-varying decryption keys using a public-key cryptography scheme before temporally sequentially supplying the first plurality of time-varying decryption keys to the mobile device.

10. The method of claim 4, further comprising performing the following using the network entity:

upon detecting that the mobile device is no longer present in the small cell:

ceasing the delivery of the multimedia content to the mobile device at the second bitrate;

despite ceasing the delivery of the multimedia content to the mobile device at the second bitrate, continuing to temporally sequentially supply to the mobile device any time-varying decryption keys in the first plurality of time-varying decryption keys that are still pending to be sent to the mobile device; and reverting to the streaming at the first bitrate for subsequent transmission of the multimedia content to the mobile device.

11. The method of claim 10, wherein reverting to the streaming at the first bitrate includes performing the following using the network entity:

commencing the streaming-based subsequent transmission of the multimedia content to the mobile device after the delivered multimedia content is substantially consumed in the mobile device.

12. The method of claim 11, wherein commencing the streaming-based subsequent transmission includes performing the following using the network entity:

determining that the delivered multimedia content is substantially consumed in the mobile device based on communication with the mobile device.

13. The method of claim 10, further comprising performing the following using the network entity:

using the time-varying cryptography scheme, scrambling new messages to be sent to the mobile device as part of the subsequent transmission of the multimedia content through streaming at the first bitrate, wherein the time-varying cryptography scheme is used in addition to any cryptography scheme used for scrambling the new messages to be sent to the mobile device through streaming at the first bitrate; and temporally sequentially supplying a second plurality of time-varying decryption keys to the mobile device as part of the time-varying cryptography scheme, wherein each decryption key in the second plurality of time-varying decryption keys is configured to de-scramble only a key-specific portion of the new messages in the subsequent transmission of the multimedia content and is supplied to the mobile device only when a time instance associated with that decryption key occurs.

14. The method of claim 4, wherein at least two decryption keys in the first plurality of time-varying decryption keys are identical.

15. The method of claim 4, further comprising performing the following using the network entity:

instructing the mobile device to use a decryption key associated with a time instance "t" in the first plurality of time-varying decryption keys to de-scramble a message associated with a time instance "t' " in the delivered multimedia content, wherein t<t'.

16. A network entity in a cellular network for delivering multimedia content to a mobile device operating in a macro cell in the cellular network, wherein the cellular network supports a first bitrate and a second bitrate for transmitting the multimedia content to the mobile device, and wherein the network entity comprises:

a transceiver for wirelessly communicating with the mobile device;

a memory for storing program instructions; and a processor coupled to the memory and the transceiver and configured to execute the program instructions, which, when executed by the processor, cause the processor to perform the following:

stream the multimedia content via the transceiver to the mobile device at the first bitrate, wherein the first bitrate is available throughout the macro cell and is substantially lower than the second bitrate; and upon detecting that the second bitrate is available in the macro cell for transmitting the multimedia content to the mobile device, download the multimedia content onto the mobile device via the transceiver at the second bitrate instead of streaming the multimedia content at the first bitrate.

17. The network entity of claim 16, wherein the network entity is one of:

a Radio Base Station (RBS);
a Base Station Controller (BSC);
a Radio Network Controller (RNC); and
an evolved Node B (eNodeB).

18. The network entity of claim 16, wherein the program instructions, upon execution by the processor, cause the processor to further perform the following:

scramble all messages in the downloaded multimedia content in a manner similar to scrambling of messages in the multimedia content streamed at the first bitrate;

further scramble all the messages in the downloaded multimedia content using a time-varying cryptography scheme that is different from a cryptography scheme used for scrambling the multimedia content streamed at the first bitrate; and supply a plurality of time-varying decryption keys to the mobile device via the transceiver in a temporally-sequential manner as part of the time-varying cryptography scheme, wherein each decryption key in the plurality of time-varying decryption keys is configured to de-scramble only a key-specific portion of the messages in the downloaded multimedia content and is supplied to the mobile device only when a time instance associated with that decryption key occurs.

19. The network entity of claim 18, wherein the cryptography scheme used for scrambling the content streamed at the first bitrate is a public-key cryptography scheme, and wherein the time-varying cryptography scheme used for scrambling the multimedia content downloaded at the second bitrate is a private-key cryptography scheme.

20. The network entity of claim 18, wherein the program instructions, upon execution by the processor, cause the processor to further perform the following:

upon detecting that the second bitrate is no longer available for transmitting the multimedia content to the mobile device:

cease the downloading of the multimedia content onto the mobile device at the second bitrate;

despite ceasing the downloading of the multimedia content onto the mobile device at the second bitrate, continue to supply to the mobile device, via the transceiver and in the temporally-sequential manner, any time-varying decryption keys in the plurality of time-varying decryption keys that are still pending to be sent to the mobile device; and revert to the streaming at the first bitrate for subsequent transmission of the multimedia content to the mobile device through the transceiver.

21. The network entity of claim 18, wherein the program instructions, upon execution by the processor, cause the processor to supply each decryption key in the plurality of time-varying decryption keys to the mobile device regardless of whether additional multimedia content is to be delivered to the mobile device at the time instance associated with that decryption key.

22. A mobile device that is operating in a macro cell in a cellular network and comprising:

a transceiver for wirelessly communicating with a network entity in the cellular network, wherein the network entity provides radio coverage over the macro cell;

a memory for storing program instructions; and a processor coupled to the memory and the transceiver and configured to execute the program instructions, which, when executed by the processor, cause the processor to perform the following:

receive via the transceiver multimedia content streamed to the mobile device at a first bitrate by the network entity, wherein the cellular network supports the first bitrate and a second bitrate for transmitting the multimedia content to the mobile device, and wherein the first bitrate is available throughout the macro cell and wherein the second bitrate is available only over a small cell within the macro cell and is substantially higher than the first bitrate;

when the mobile device is present in the small cell, receive the multimedia content via the transceiver as a download sent from the network entity at the second bitrate, instead of receiving the multimedia content as a streamed content at the first bitrate, wherein the download includes:

a plurality of messages twice-scrambled by the network entity, wherein each message in the plurality of messages is initially scrambled by the network entity using a cryptography scheme that is the same as that used by the network entity for scrambling the multimedia content streamed at the first bitrate, and wherein each initially-scrambled message in the plurality of messages is further scrambled by the network entity using a time-varying cryptography scheme that is different from the cryptography scheme used by the network entity for scrambling the multimedia content streamed at the first bitrate, and a current decryption key sent to the mobile device by the network entity as part of the time-varying cryptography scheme, wherein the current decryption key is part of a plurality of time-varying decryption keys to be sent to the mobile device by the network entity in a temporally-sequential manner, wherein each decryption key in the plurality of time-varying decryption keys is configured to de-scramble only a key-specific portion of the plurality of messages and is supplied to the mobile device only when a time instance associated with that decryption key occurs; and using the current decryption key, de-scramble only that message in the plurality of messages which is associated with the current decryption key.

\* \* \* \* \*